(12) United States Patent
Momose

(10) Patent No.: US 6,749,675 B2
(45) Date of Patent: Jun. 15, 2004

(54) AQUEOUS INK COMPOSITION

(75) Inventor: Masayuki Momose, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 67 days.

(21) Appl. No.: 10/116,734

(22) Filed: Apr. 4, 2002

(65) Prior Publication Data
US 2003/0101905 A1 Jun. 5, 2003

(30) Foreign Application Priority Data

| Apr. 6, 2001 | (JP) | P.2001-109309 |
| Apr. 6, 2001 | (JP) | P.2001-109310 |
| Apr. 6, 2001 | (JP) | P.2001-109312 |
| Apr. 6, 2001 | (JP) | P.2001-109313 |
| Apr. 6, 2001 | (JP) | P.2001-109314 |
| May 9, 2001 | (JP) | P.2001-139027 |
| May 9, 2001 | (JP) | P.2001-139035 |
| May 9, 2001 | (JP) | P.2001-139037 |

(51) Int. Cl.$^7$ ............................ C09D 11/00
(52) U.S. Cl. .................. 106/31.58; 106/31.59; 106/31.86; 106/31.89
(58) Field of Search .................. 106/31.58, 31.86, 106/31.59, 31.89

(56) References Cited

U.S. PATENT DOCUMENTS

| 5,075,699 A | * | 12/1991 | Koike et al. | 347/100 |
| 5,164,232 A | * | 11/1992 | Henseleit et al. | 427/288 |
| 5,554,213 A | * | 9/1996 | Radigan et al. | 106/31.43 |
| 5,879,439 A | * | 3/1999 | Nagai et al. | 106/31.28 |
| 5,882,390 A | * | 3/1999 | Nagai et al. | 106/31.49 |
| 5,972,086 A | * | 10/1999 | Kato et al. | 106/31.43 |
| 6,436,180 B1 | * | 8/2002 | Ma et al. | 106/31.59 |
| 2003/0084817 A1 | * | 5/2003 | Sarkisian et al. | 106/31.58 |
| 2003/0097960 A1 | * | 5/2003 | Ito et al. | 106/31.58 |
| 2003/0097961 A1 | * | 5/2003 | Yatake et al. | 106/31.59 |
| 2003/0106462 A1 | * | 6/2003 | Yatake et al. | 106/31.59 |

FOREIGN PATENT DOCUMENTS

| JP | 63139964 | 6/1988 |
| JP | 4239068 | 8/1992 |

OTHER PUBLICATIONS

Derwent English Translation of JP 63–139964, Jun. 1988, abstract.*
Derwent English Translation of JP 04–239068, Aug. 1992, abstract.*

* cited by examiner

Primary Examiner—Mark L. Bell
Assistant Examiner—Veronica F. Faison
(74) Attorney, Agent, or Firm—Ladas & Parry

(57) ABSTRACT

An aqueous ink composition comprising at least: a colorant; water; 0.005 to 10 wt. %, based on the whole weight of the ink composition, of at least one acetylene alcohol compound represented by the following formula (1):

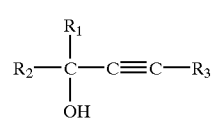

(1)

wherein $R_1$, $R_2$ and $R_3$ each independently represents a hydrogen atom, an alkyl group which may be branched, or an alkylphenyl group; and a surface active substance capable of causing the acetylene alcohol compound of formula (1) to dissolve in water.

10 Claims, No Drawings

AQUEOUS INK COMPOSITION

FIELD OF THE INVENTION

The present invention relates to aqueous ink compositions, particularly to quick-drying type aqueous ink compositions suitable for ink jet printing method.

BACKGROUND OF THE INVENTION

It has bee the common practice to add, to aqueous ink compositions, a surface active substance in order to (a) improve print quality (including adaptability to paper), (b) improve quick drying property and (c) prevent bleeding between adjacent colors upon multi-color printing.

Since a surface active substance to be added to aqueous ink compositions is required to have high penetration promoting effects into a recording medium and structural characteristic that does not cause defects such as bubbling during printing, a nonionic surfactant is often selected as the surface active substance. Particularly, surfactants such as acetylene alcohol compounds and acetylene glycol compounds have attracted attentions as surfactants capable of satisfying the above-described requirements. Among them, acetylene alcohol compounds have markedly high penetration promoting effects and they are known to provide excellent print quality even with a small addition amount (for example, Japanese Patent Laid-Open No. 139964/1988, Japanese Patent Laid-Open No. 239068/1992).

Acetylene alcohol compound based surfactants having a structure exhibiting stronger hydrophobicity are preferred because of their higher penetration promoting effects. They, however, have low solubility in water so that there may be the case where attention should be given to ejection property and clogging property.

SUMMARY OF THE INVENTION

The present invention has been made in view of the above-described problems, and an object of the present invention is to provide an aqueous ink composition excellent in (a) improvement of ejection stability, (b) improvement of print quality, (c) improvement in fixing property (scratch resistance), (d) reduction in running cost, and (e) improvement of adaptability to paper.

Another object of the present invention is to provide an ink cartridge having the aqueous ink composition contained therein.

Other objects and effects of the invention will become apparent from the following description.

The present inventors have investigated and studied improvement in solubility in water of an acetylene alcohol compound based surfactant of a strong hydrophobic structure (which may be hereinafter referred simply to "hydrophobic"). As a result, it was found that combined use, in an aqueous ink composition, of a specific acetylene alcohol based surfactant and a surface active substance capable of causing an effective amount of the acetylene alcohol based surfactant to dissolve in water makes it possible: to improve water solubility of the acetylene alcohol based surfactant, leading to improvement in ejection stability and clogging resistance without causing defects such as bubbling; to increase the addition amount of the acetylene alcohol based surfactant, so that improvement in print quality, improvement in adaptability to paper and reduction of a running cost can be attempted; and to improve penetration, thereby improving fixing property (scratch resistance) particularly when a pigment is used as a colorant. The invention has been completed based on the above-described findings.

The above-described objects of the invention have been achieved by providing an aqueous ink composition comprising at least: a colorant; water; 0.005 to 10 wt. %, based on the weight of the ink composition, of an acetylene alcohol compound represented by the following formula (1):

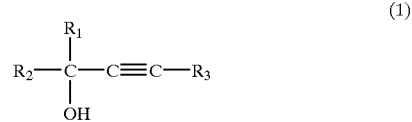

wherein $R_1$, $R_2$ and $R_3$ each independently represents a hydrogen atom, an alkyl group which may be branched, or an alkylphenyl group; and a surface active substance capable of causing the acetylene alcohol compound of formula (1) to dissolve in water.

1) In a first preferred embodiment of the invention, the surface active substance comprises at least one compound selected from compounds represented by the following formulas (21a), (21b), (21c), (21d), (21e) and (21f):

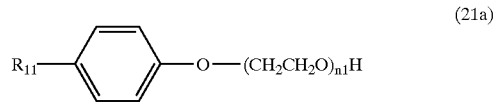

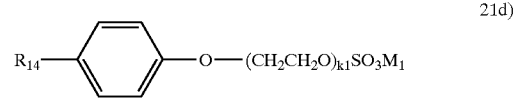

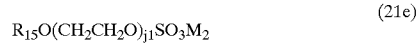

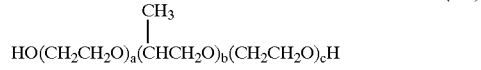

wherein $R_{11}$ to $R_{15}$ each independently represents a $C_{1-15}$ alkyl group which may be branched, subscripts n1, m1, h1, k1, j1, a, b and c each independently stands for 1 to 30, and $M_1$ and $M_2$ each independently represents a hydrogen atom, an alkali metal or a base such as ammonium.

2) In a second preferred embodiment of the invention the surface active substance comprises at least one 1,2-alkyldiol compound represented by the following formula (22):

wherein $R_{21}$ represents a $C_{1-10}$ alkyl group.

3) In a third preferred embodiment of the invention, the surface active substance comprises at least one compound selected from the compounds represented by the following formulas (23a) and (23b):

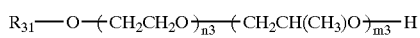
(23a)

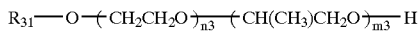
(23b)

wherein $R_{31}$ represents a $C_{1-15}$ alkyl group which may be branched, or an alkylphenyl group, and subscripts n3 and m3 each independently stands for 0 to 10.

4) In a fourth preferred embodiment of the invention, the surface active substance comprises at least one compound selected from phosphate ester compounds represented by the following formulas (24a) and (24b):

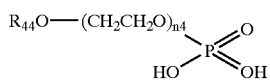
(24a)

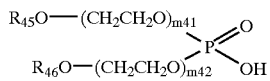
(24b)

wherein $R_{44}$, $R_{45}$, and $R_{46}$ each independently represents a $C_{8-30}$ alkyl group which may be branched, or an alkylphenyl group, and subscripts n4, m41 and m42 each independently stands for 1 to 30.

5) In a fifth preferred embodiment of the invention, the surface active substance comprises at least one compound selected from:

highly water-soluble acetylene glycol compounds represented by the following formula (25a):

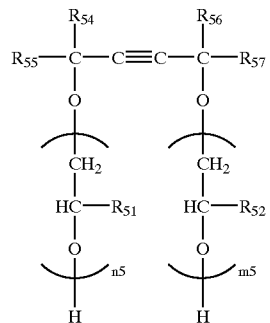
(25a)

wherein $R_{54}$, $R_{55}$, $R_{56}$ and $R_{57}$ each independently represents a $C_{1-30}$ alkyl group which may be branched, or an alkylphenyl group, $R_{51}$ and $R_{52}$ each independently represents a hydrogen atom or a methyl group, and subscripts n5 and m5 each stands for an integer of 0 to 30; and highly water-soluble acetylene alcohol compounds represented by the following formula (25b):

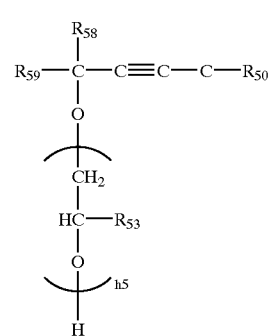
(25b)

wherein $R_{58}$, $R_{59}$ and $R_{50}$ each independently represents a hydrogen atom or an alkyl group which may be branched, $R_{53}$ represents a hydrogen atom or a methyl group, and a subscript h5 stands for an integer of 0 to 30, with the proviso that $R_{58}+R_{59}+R_{50}<5$.

The present invention also relates to an ink cartridge having an ink container containing any one of the above-described aqueous ink compositions.

DETAILED DESCRIPTION OF THE INVENTION

Components used for the aqueous ink composition of the invention are described in detail below. The term "aqueous ink composition" as used herein means, for black-and-white recording, an aqueous black ink composition, while for color printing, it means a color ink composition, more specifically, an aqueous yellow ink composition, an aqueous magenta ink composition and an aqueous cyan ink composition, and further optionally, an aqueous black ink composition.

To the aqueous ink composition of the invention, a water soluble compound can be further added in order to improve recording stability such as writing properties and ejection properties. Addition of a proper water-soluble compound may impart writing things such as pen with smooth writing properties free of partial thinning and inkjet recording with more stable ejection properties. As such a water soluble compound, organic solvents and water soluble solids ordinarily employed for aqueous ink compositions can be used. Specific examples thereof include low-molecular-weight glycols such as ethylene glycol, diethylene glycol, triethylene glycol, tetraethylene glycol and dipropylene glycol; polyols such as 1,3-propanediol, 1,4-butanediol, 1,5-pentanediol, 1,6-hexanediol, 1,2,6-hexanetriol, pentaerythritol and glycerin; lower alcohols such as ethanol and propanol; cellosolves such as ethylene glycol monomethyl ether and ethylene glycol monoethyl ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; ureas such as urea, thiourea, ethylene urea and 1,3-dimethylimidazolidinone; and saccharides such as maltitol, sorbitol, gluconolactone and maltose.

The addition amount of the aqueous compound is added preferably 1 to 30 wt. %, more preferably 5 to 25 wt. %, based on the whole weight of the aqueous ink composition.

Amounts exceeding 30 wt. % make it difficult to adjust the viscosity of the aqueous ink composition to fall within a desired range, which may deteriorate ejection stability. Amounts less than 1 wt. %, on the other hand, may fail to bring about desired effects.

The feature of the aqueous ink composition of the present invention resides in the use of the above-described "at least one acetylene alcohol compound represented by formula (1)" and the "surface active substance capable of causing the acetylene alcohol compound of formula (1) to dissolve in water" in combination.

By using the "acetylene alcohol based surfactant represented by formula (1)" in combination with the "surface active substance capable of causing the acetylene alcohol based surfactant to dissolve in water" in an aqueous ink composition with a view to improving print quality and quick-drying property and preventing, as much as possible, bleeding between adjacent colors upon multicolor printing, water solubility of the acetylene alcohol based surfactant is enhanced and the penetration property of the aqueous ink composition through a recording medium is improved, thereby obtaining excellent effects in improvement of ejection stability, improvement in print quality, improvement in fixing property (scratch resistance), reduction of a running cost and improvement of adaptability to paper.

As the acetylene alcohol compound represented by formula (1), two or more compounds different in $R_1$, $R_2$ and/or $R_3$ can be used together. Specific examples thereof are shown below in Table 1. Of course, the acetylene alcohol compounds usable in the invention are not limited thereto.

TABLE 1

$$R_2-\underset{\underset{OH}{|}}{\overset{\overset{R_1}{|}}{C}}-C\equiv C-R_3 \quad (1)$$

| Compound | $R_1$ | $R_2$ | $R_3$ |
|---|---|---|---|
| I-1 | —$CH_3$ | —$CH_3$ | —H |
| I-2 | —$CH_3$ | —$CH_2CH_3$ | —H |
| I-3 | —$CH_3$ | —$CH_2CH(CH_3)(CH_3)$ | —H |
| I-4 | —$CH_3$ | —$CH_2CH(CH_3)(CH_2CH_3)$ | —H |
| I-5 | —$CH_3$ | —$CH_2CH(CH_3)(CH_3)$ | —$CH_3$ |
| I-6 | —$CH_3$ | —$CH_2CH_3$ | —$CH_2CH_3$ |
| I-7 | —$CH_3$ | —$CH_2CH(CH_3)(CH_3)$ | —$CH_2CH(CH_3)(CH_3)$ |

Among the acetylene alcohol compounds of formula (1), preferred are those having a structure of stronger hydrophobicity, that is, those greater in the total number of carbon atoms of $R_1$, $R_2$ and $R_3$, because their penetration promoting effects are high.

The acetylene alcohol compounds of formula (1) having 5 or greater, more preferably 7 or greater, carbon atoms in total of $R_1$, $R_2$ and $R_3$ are preferred.

The total amount of the acetylene alcohol compounds of formula (1) contained in the aqueous ink composition is 0.005 to 10 wt. %, more preferably 0.01 to 5 wt. %.

When the total amount of the acetylene alcohol compounds is less than 0.005 wt. %, the desired penetration effects may be hardly exhibited. Total amounts exceeding 10 wt. %, on the other hand, may make it difficult to adjust the viscosity of the resulting aqueous ink composition within a desired range or may cause defects such as marked deterioration in ejection stability owing to low water solubility.

Next, preferred embodiments of the "surface active substance capable of causing the acetylene alcohol compound of formula (1) to dissolve in water" to be used in the invention is described in more detail.

Specific examples of the compound represented by formula (21a) include polyoxyethylene octylphenyl ether and polyoxyethylene nonylphenyl ether; specific examples of the compound represented by formula (21b) include polyoxyethylene oleyl ether and polyoxyethylene lauryl ether; specific examples of the compound represented by formula (21c) include polyoxyethylene oleate ester; specific example of the compound represented by formula (21d) include ammonium polyoxyethylene nonyl phenyl ether sulfate; and specific examples of the compound represented by formula (21e) include sodium polyoxyethylene oleyl ether sulfate. Specific examples of these formulae are however not limited thereto.

Examples of the compound represented by formula (21f) include polyoxyethylene-polyoxypropylene block copolymers. Various compounds different in chain length represented by a, b and/or c can be used.

Specific examples of the 1,2-alkyldiol compound represented by formula (22) include 1,2-butanediol, 1,2-pentanediol, 1,2-hexanediol, 1,2-heptanediol and 1,2-octanediol. Of course, the 1,2-alkyldiol compounds usable in the invention are not limited thereto.

Incidentally, 1,2-alkyldiol compounds of formula (22) wherein R represents an alkyl group having 11 or greater carbon atoms has reduced water solubility, which might inhibit the addition thereof in an amount sufficient for obtaining desired effects.

As the compounds of formulas (23a) and (23b), compounds shown in Tables 2 and 3 can be given as specific examples, but the compounds usable in the invention are not limited thereto.

The compounds of formulas (23a) and (23b) each contains, in the molecule thereof, an ethylene oxide group and a propylene oxide group. Various compounds different in chain length represented by n3 and/or m3 can be used.

TABLE 2

| Compound | $R_{31}$ | n3 | m3 |
|---|---|---|---|
| 23-1 | $H_3C-\underset{\underset{OCH_3}{|}}{\overset{\overset{CH_3}{|}}{C}}-CH_2-CH_2-$ | 4 | 0 |
| 23-2 | $H_3C-CH_2-CH_2-\underset{\underset{CH_3}{|}}{CH}-CH_2-CH_2-$ | 6 | 2 |
| 23-3 | $H_3C-\underset{\underset{CH_3}{|}}{CH}-CH_2-CH_2-CH_2-CH_2-$ | 5 | 2 |
| 23-4 | $H_3C-\underset{\underset{CH_3}{|}}{CH}-CH_2-\underset{\underset{CH_3}{|}}{CH}-$ | 5 | 2 |
| 23-5 | $H_3C-\underset{\underset{CH}{|}}{\overset{\overset{OCH_3}{|}}{}}-CH_2-$ | 2 | 0 |

TABLE 3

| Compound | $R_{31}$ | n3 | m3 |
|---|---|---|---|
| 23-6 | (CH$_3$)$_2$CH-CH$_2$-CH$_2$- | 3 | 2 |
| 23-7 | H$_3$C-CH$_2$-CH$_2$-CH$_2$-CH(CH$_2$CH$_3$)-CH$_2$- | 5 | 2 |
| 23-8 | H$_3$C-CH$_2$-CH$_2$-CH$_2$-CH$_2$-CH(CH$_3$)- | 5 | 2 |

TABLE 3-continued

| Compound | $R_{31}$ | n3 | m3 |
|---|---|---|---|
| 23-9 | (H$_3$C)(CH$_3$)CH-CH$_2$- | 6 | 2 |
| 23-10 | H$_3$C-CH$_2$-CH$_2$-CH$_2$- | 3 | 2 |

As specific examples of the phosphate ester compounds represented by formulas (24a) and (24b), compounds shown in Tables 4 and 5 can be given. Of course, the phosphate ester compounds are not limited thereto.

As the phosphate ester compounds of formulas (24a) and (24b), various compounds having, in the molecule thereof, an ethylene oxide group and different in chain length represented by n4, m41 and/or m42 can be used.

TABLE 4

| Compound | $R_{41}$ | n4 |
|---|---|---|
| 24a-1 | H$_3$C-(CH$_2$)$_5$- | 4 |
| 24a-2 | H$_3$C-CH(CH$_3$)-CH$_2$-CH(CH$_3$)-CH$_2$-CH(CH$_3$)-CH$_2$-CH(CH$_3$)-CH$_2$- | 6 |
| 24a-3 | H$_3$C-(CH$_2$)$_7$- | 5 |
| 24a-4 | H$_3$C-(CH$_2$)$_8$- | 10 |
| 24a-5 | Ph-CH$_2$-C(CH$_3$)(OCH$_3$)-CH$_2$-CH$_2$- | 8 |

TABLE 5

| Compound | $R_{45}$ | $R_{46}$ | m41 | m42 |
|---|---|---|---|---|
| 24b-1 | H$_3$C-(CH$_2$)$_4$- | H$_3$C-(CH$_2$)$_4$- | 4 | 4 |
| 24b-2 | H$_3$C-CH(CH$_3$)-CH$_2$-CH(CH$_3$)-CH$_2$- | CH(CH$_3$)-CH$_2$-CH(CH$_3$)-CH$_2$- | 6 | 6 |
| 24b-3 | H$_3$C-(CH$_2$)$_8$- | H$_3$C-(CH$_2$)$_8$- | 10 | 10 |
| 24b-4 | H$_3$C-(CH$_2$)$_8$- | H$_3$C-(CH$_2$)$_{12}$- | 6 | 10 |
| 24b-5 | H$_3$C-(CH$_2$)$_8$- | Ph-CH$_2$-C(CH$_3$)(OCH$_3$)-CH$_2$-CH$_2$- | 6 | 8 |

As the acetylene glycol compound of formula (25a) having high water solubility, two or more compounds different in any of $R_{54}$ to $R_{57}$ can be used simultaneously. As specific examples thereof, compounds as shown in Table 6 can be given, but compounds usable in the invention are not limited thereto.

TABLE 6

(25a)

$$R_{55}-\underset{\underset{H}{\overset{O}{\underset{\displaystyle CH_2}{\overset{|}{\underset{\displaystyle HC-R_{51}}{\overset{|}{\underset{\displaystyle O}{\overset{|}{\underset{n5}{}}}}}}}}}}{\overset{R_{54}}{\overset{|}{C}}}-C\equiv C-\underset{\underset{H}{\overset{O}{\underset{\displaystyle CH_2}{\overset{|}{\underset{\displaystyle HC-R_{52}}{\overset{|}{\underset{\displaystyle O}{\overset{|}{\underset{m5}{}}}}}}}}}}{\overset{R_{56}}{\overset{|}{C}}}-R_{57}$$

| Compound | $R_{54}$ | $R_{55}$ | $R_{56}$ | $R_{57}$ | $R_{51}$ | $R_{52}$ | n5 + m5 |
|---|---|---|---|---|---|---|---|
| 25a-1 | —$CH_3$ | —$CH_3$ | —$CH_3$ | —$CH_3$ | — | — | 0 |
| 25a-2 | —$CH_3$ | —H | —$CH_3$ | — | —H | —H | 10 |
| 25a-3 | —$CH_3$ | —$C_2H_5$ | —$CH_3$ | —$C_2H_5$ | —H | —H | 10 |
| 25a-4 | —$CH_3$ | —$CH_3$ | —$CH_3$ | —$CH_3$ | —$CH_3$ | —$CH_3$ | 10 |
| 25a-5 | —$CH_3$ | —$C_2H_5$ | —$CH_3$ | —$C_2H_5$ | —$CH_3$ | —$CH_3$ | 20 |

As the highly water-soluble acetylene alcohol compound of formula (25b), two or more compounds different in any of $R_{58}$, $R_{59}$ and $R_{50}$ can be used simultaneously. As specific examples thereof, compounds as shown in Table 7 can be given, but compounds usable in the invention are not limited thereto.

TABLE 7

(25b)

$$R_{59}-\underset{\underset{H}{\overset{O}{\underset{\displaystyle CH_2}{\overset{|}{\underset{\displaystyle HC-R_{53}}{\overset{|}{\underset{\displaystyle O}{\overset{|}{\underset{h5}{}}}}}}}}}}{\overset{R_{58}}{\overset{|}{C}}}-C\equiv C-C-R_{50}$$

| Compound | $R_{58}$ | $R_{59}$ | $R_{50}$ | $R_{53}$ | h5 |
|---|---|---|---|---|---|
| 25b-1 | —$CH_3$ | —$CH_3$ | —H | — | 0 |
| 25b-2 | —$CH_3$ | —$C_2H_5$ | —H | — | 0 |
| 25b-3 | —$CH_3$ | —$CH_3$ | —$CH_3$ | —H | 10 |
| 25b-4 | —$CH_3$ | —$CH_3$ | —$CH_3$ | —H | 10 |
| 25b-5 | —$CH_3$ | —$C_2H_5$ | —$C_2H_5$ | —$CH_3$ | 20 |

The total addition amount, in the aqueous ink composition, of "surface active substance capable of causing an acetylene alcohol compound to dissolve in water" to be used in combination with the acetylene alcohol compound having a highly hydrophobic structure in order to enhance its water solubility is desirably an amount that allows substantially the whole amount of the acetylene alcohol compound to be dissolved in the aqueous ink composition, preferably 0.1 to 10 wt. %, more preferably 0.2 to 5 wt. %.

Amounts less than 0.1 wt. % may disturb exhibition of desired effects, that is, effects for causing a necessary amount of the acetylene alcohol compound to dissolve sufficiently, thereby presumably deteriorating ejection stability. Amounts exceeding 10 wt. %, on the other hand, may cause defects such as difficulty in adjusting the viscosity of the aqueous ink composition within a desired range.

In the invention, either a dye or a pigment may be used as the colorant. In aspects of light resistance and water resistance, a pigment is preferred. A combination of a pigment and a dye may also be used.

Use of a pigment as the colorant improves penetration property of the resulting aqueous ink composition, thereby bringing about marked effects of improving fixing property (scratch resistance).

The content of the colorant in the aqueous ink composition is preferably about 0.5 to 25 wt. %, more preferably about 2 to 15 wt. %.

No particular limitation is imposed on the pigment employed and either inorganic pigment or organic pigment can be used. Examples of the inorganic pigment include, in addition to titanium oxide and iron oxide, carbon black prepared in a known manner such as contact process, oil furnace process or thermal process. Examples of the organic pigment include azo pigments such as azo pigment lakes, insoluble azo pigments, azo condensation pigments and azo chelated pigments; phthalocyanine pigments such as copper phthalocyanine pigments and metal-free phthalocyanine pigments; polycyclic condensation pigments such as anthraquinone pigments, perylene pigments, perinone pigments, quinacridone pigments, dioxazine pigments, thioindigo pigments, isoindolinone pigments and quinophthalone pigments; dye lakes such as basic dye lakes and acidic dye lakes; nitro pigment; nitroso pigment; and aniline black.

The pigment has a particle size of preferably 10 μm or less, more preferably 1 μm or less.

Examples of the carbon black to be used for black ink include products of Mitsubishi Chemical such as No. 2300, No. 900, MCF88, No. 33, No. 40, No. 45, No. 52, MA7, MA8, MA100 and No. 2200B; products of Columbian Chemical such as Raven 5750, Raven 5250, Raven 5000, Raven 3500, Raven 1255 and Raven 700; products of Cabot such as Regal 400R, Regal 330R, Regal 660R, Mogul L, Monarch 700, Monarch 800, Monarch 880, Monarch 900, Monarch 1000, Monarch 1100, Monarch 1300, and Monarch 1400; and products of Degussa such as Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4.

Examples of the pigment to be used for yellow ink include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151, and C.I. Pigment Yellow 154.

Examples of the pigment to be used for magenta ink include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 123, C.I. Pigment Red 168, C.I. Pigment Red 184 and C.I. Pigment Red 202.

Examples of the pigment used for cyan ink include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Vat Blue 4 and C.I. Vat Blue 60.

In the present invention, it is possible to use a pigment (surface-treated pigment) having a surface treated to bond thereto at least one of: functional groups such as sulfone, carbonyl, carboxyl, hydroxyl and amino; and salts thereof, directly or via a bonding group such as a $C_{1-10}$ alkylene or a phenylene group, thereby allowing it to be dispersible in water without a dispersant.

In the present invention, the pigment is preferably used in the form of a pigment dispersion obtained by dispersing the pigment in an aqueous medium by an aid of a dispersant. As the dispersant to be used for the preparation of the pigment dispersion, dispersants ordinarily employed for the preparation of a pigment dispersion, for example, polymeric dispersants and surfactants may be used. It is apparent that the surfactant contained in the pigment dispersion will also function as a surfactant for the aqueous ink composition.

Preferred examples of the polymeric dispersant include natural polymers. Specific examples thereof include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Preferred examples of the polymeric dispersant also include synthetic polymers. Specific examples thereof include polyvinyl alcohols, polyvinylpyrrolidones; acrylic resins such as polyacrylic acid, acrylic acid-acrylonitrile copolymer, potassium acrylate-acrylonitrile copolymer, vinyl acetate-acrylate ester copolymers and acrylic acid-acrylate ester copolymers; styrene-acrylic resins such as styrene-acrylic acid copolymer, styrene-methacrylic acid copolymer, styrene-methacrylic acid-acrylate ester copolymers, styrene-α-methylstyrene-acrylic acid copolymer, styrene-α-methylstyrene-acrylic acid-acrylate ester copolymers; styrene-maleic acid copolymer, styrene-maleic anhydride copolymer, vinyl naphthalene-acrylic acid copolymer, vinyl naphthalene-maleic acid copolymer; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Of these, copolymers of a monomer having a hydrophobic group and a monomer having a hydrophilic group and polymers of a monomer having both a hydrophobic group and a hydrophilic group in its molecular structure are particularly preferred.

The pigment dispersion to be used in the invention can be prepared, for example, by mixing a pigment, a dispersant, water or a mixture of water and a water-soluble organic solvent, and then dispersing the resulting mixture in a disperser such as beads mill, ball mill, sand mill, attritor, roll mill, agitator, Henschel mixer, colloid mill, ultrasonic homogenizer or pearl mill.

In the present invention, various dyes ordinarily employed for ink jet printing such as direct dyes, acid dyes, food dyes, basic dyes, photo-reactive dyes, disperse dyes, vat dyes, soluble vat dyes and reactive disperse dyes are usable as the dye.

To the aqueous ink composition of the invention, a fixing agent may be added further as needed.

Water-soluble resins may be used as the fixing agent. Specific examples thereof include water soluble rosins, alginic acid derivatives, polyvinyl alcohol, hydroxypropyl cellulose, carboxymethyl cellulose, hydroxyethyl cellulose, methyl cellulose, styrene-acrylic acid resin, styrene-acrylic acid-acrylate ester resins, styrene-maleic acid resin, styrene-maleate half ester resin, acrylic acid-acrylate ester resins, isobutylene-maleic acid resin, rosin-modified maleic acid resin, polyvinylpyrrolidone, gum arabic starch, polyallylamine, polyvinylamine and polyethyleneimine.

The aqueous ink composition of the invention may contain other additives, for example, a pH regulator, antiseptic and/or mildewproofing agent. Examples of the pH regulator include various amines such as diethanolamine and triethanolamine, and hydroxides of an alkali metal such as sodium hydroxide, potassium hydroxide and lithium hydroxide.

The aqueous ink composition of the invention has preferably a surface tension at 20° C. of 20 to 55 mN/m, more preferably 25 to 45 mN/m.

At surface tension less than 20 mN/m, it may occur a phenomenon that the aqueous ink composition unevenly wets the vicinity of an ejection nozzle and such a phenomenon may deteriorate the ejection stability. Surface tension exceeding 55 mN/m, on the other hand, may disturb exhibition of desired penetration effects.

The aqueous ink composition of the invention is preferably employed as an ink for inkjet recording.

The ink cartridge of the invention is equipped with an ink container to contain the aqueous ink composition. The ink container preferably has a mechanism of generating an appropriate negative pressure relative to the atmospheric pressure so as to prevent ink leakage of the aqueous ink composition from the ink cartridge by gravity even if the ink container is communicated with the air. Examples of the mechanism generating a negative pressure include a structure equipped with a porous ink absorbing material such as polyurethane and a structure to control the shape of the ink container by mechanical action via spring or the like. Either manner may be employed in the invention.

The present invention will be illustrated in greater detail with reference to the following Examples and Comparative Examples, but the invention should not be construed as being limited thereto.

EXAMPLES AND COMPARATIVE EXAMPLES

Preparation of Aqueous Ink Compositions

Glycerin (5 g), 5 g of diethylene glycol and additives as shown in Examples and Comparative Examples in Tables 8 to 12 were mixed, followed by the addition of ultrapure water to give the total amount of 100 g. Triethanolamine was then added to the resulting mixtures to adjust their pH to 7.5. At 25° C., the mixtures were stirred for 2 hours. The reaction mixtures were then filtered under pressure of 2 kg/cm² through a membrane filter of 5 μm in diameter, whereby aqueous ink compositions were obtained.

The amount of the colorant as shown in Tables 8 to 12 is given in terms of a solid content.

TABLE 8

|  | Ex. 1-1 | Ex. 1-2 | Ex. 1-3 | Ex. 1-4 | Ex. 1-5 | Ex. 1-6 | Comp. Ex. 1-1 | Comp. Ex. 1-2 | Comp. Ex. 1-3 | Comp. Ex. 1-4 | Comp. Ex. 1-5 |
|---|---|---|---|---|---|---|---|---|---|---|---|
| Colorant 1 (g) | 5 |  |  |  | 5 |  | 5 |  |  |  |  |
| Colorant 2 (g) |  | 4 |  |  |  |  |  |  |  | 4 |  |
| Colorant 3 (g) |  |  | 4 |  |  |  |  |  | 4 |  |  |
| Colorant 4 (g) |  |  |  | 5 |  | 5 |  | 5 |  |  | 5 |
| Compound 1-1 (g) |  |  |  |  |  | 1.5 |  |  |  |  |  |
| Compound 1-2 (g) |  |  | 1 |  |  |  |  |  |  |  |  |
| Compound 1-3 (g) | 0.5 |  |  | 0.5 |  |  |  |  | 10.1 |  |  |
| Compound 1-4 (g) |  | 0.3 |  |  | 0.3 |  |  |  |  | 1.5 |  |
| Compound 1-5 (g) |  |  |  |  |  |  |  |  |  |  | 0.5 |
| Polyoxyethylene octylphenyl ether (g) | 0.8 |  |  |  |  |  |  |  | 1.2 |  |  |
| Polyoxyethylene oleyl ether (g) |  | 1 |  |  |  |  |  | 1 |  |  |  |
| Polyoxyethylene oleic acid ether (g) |  |  | 0.8 |  |  |  |  |  |  |  |  |
| Ammonium polyoxyethylene nonylphenyl ether sulfate (g) |  |  |  | 1 |  |  |  |  |  |  |  |
| Sodium polyoxyethylene oleyl ether sulfate (g) |  |  |  |  | 1 |  |  | 1 |  |  |  |
| Polyoxyethylene polyoxypropylene block copolymer (g) |  |  |  |  |  | 0.6 |  |  |  |  |  |

Colorant 1: "Direct Fast Black" (trade name; product of Sumitomo Chemical industry: direct dye)
Colorant 2: #0542 (trade name; product of Mikuni Shikiso: resin dispersion type pigment)
Colorant 3: "Karayas Turquoise Blue GL" (trade name; Nippon Kayaku: direct dye)
Colorant 4: "Cabojet 300" (trade name; product of Cabot Speciality Chemicals Ink: surface-modified type pigment)

TABLE 9

|  | Ex. 2-1 | Ex. 2-2 | Ex. 2-3 | Ex. 2-4 | Ex. 2-5 | Ex. 2-6 | Comp. Ex. 2-1 | Comp. Ex. 2-2 | Comp. Ex. 2-3 | Comp. Ex. 2-4 | Comp. Ex. 2-5 |
|---|---|---|---|---|---|---|---|---|---|---|---|
| Colorant 1 (g) | 5 |  |  |  | 5 |  | 5 |  |  |  |  |
| Colorant 2 (g) |  | 4 |  |  |  |  |  |  |  | 4 |  |
| Colorant 3 (g) |  |  | 4 |  |  |  |  |  | 4 |  |  |
| Colorant 4 (g) |  |  |  | 5 |  | 5 |  | 5 |  |  | 5 |
| Compound 1-1 (g) |  |  |  |  |  | 1.5 |  |  |  |  |  |
| Compound 1-2 (g) |  |  | 1 |  |  |  |  |  |  |  |  |
| Compound 1-3 (g) | 0.5 |  |  | 0.5 |  |  |  |  | 10.1 |  |  |
| Compound 1-4 (g) |  | 0.3 |  |  | 0.3 |  |  |  |  | 1.5 |  |
| Compound 1-5 (g) |  |  |  |  |  |  |  |  |  |  | 0.5 |
| 1,2-Hexanediol (g) | 5 | 3 |  | 5 |  |  | 3 |  | 1.2 |  |  |
| 1,2-Octanediol (g) |  |  | 4 |  |  | 4 |  |  |  |  |  |
| 1,2-Pentanediol (g) |  |  |  |  | 5 |  |  |  | 3 |  |  |
| 1,2-Butanediol (g) |  |  |  |  |  |  |  | 3 |  |  |  |

Colorant 1: "Direct Fast Black" (trade name; product of Sumitomo Chemical Industry: direct dye)
Colorant 2: #0542 (trade name; product of Mikuni Shikiso: resin dispersion type pigment)
Colorant 3: "Karayas Turquoise Blue GL" (trade name; Nippon Kayaku: direct dye)
Colorant 4: "Cabojet 300" (trade name; product of Cabot Speciality Chemicals Ink: surface-modified type pigment)

TABLE 10

|  | Ex. 3-1 | Ex. 3-2 | Ex. 3-3 | Ex. 3-4 | Ex. 3-5 | Ex. 3-6 | Comp. Ex. 3-1 | Comp. Ex. 3-2 | Comp. Ex. 3-3 | Comp. Ex. 3-4 | Comp. Ex. 3-5 |
|---|---|---|---|---|---|---|---|---|---|---|---|
| Colorant 1 (g) | 5 |  |  |  | 5 |  | 5 |  |  |  |  |
| Colorant 2 (g) |  | 4 |  |  |  |  |  |  |  | 4 |  |
| Colorant 3 (g) |  |  | 4 |  |  |  |  |  | 4 |  |  |
| Colorant 4 (g) |  |  |  | 5 |  | 5 |  | 5 |  |  | 5 |
| Compound 1-1 (g) |  |  |  |  |  | 1.5 |  |  |  |  |  |
| Compound 1-2 (g) |  | 1 |  |  |  |  |  |  |  |  |  |
| Compound 1-3 (g) | 0.5 |  |  | 0.5 |  |  |  |  | 10.1 |  |  |
| Compound 1-4 (g) |  | 0.3 |  |  | 0.3 |  |  |  |  | 1.5 |  |
| Compound 1-5 (g) |  |  |  |  |  |  |  |  |  |  | 0.5 |
| Compound 23-1 (g) | 5 |  |  |  |  |  | 5 |  |  |  |  |
| Compound 23-3 (g) |  | 4 |  |  |  |  |  |  |  |  |  |
| Compound 23-4 (g) |  |  | 3 |  | 3 |  |  | 3 |  |  |  |
| Compound 23-5 (g) |  |  |  | 3 |  |  |  |  |  |  |  |
| Compound 23-9 (g) |  |  |  |  |  | 5 |  |  |  | 5 |  |

Colorant 1: "Direct Fast Black AB" (trade name; product of Sumitomo Chemical Industry: direct dye)
Colorant 2: #0542 (trade name; product of Mikuni Shikiso: resin dispersion type pigment)
Colorant 3: "Karayas Turquoise Blue GL" (trade name; Nippon Kayaku: direct dye)
Colorant 4: "Cabojet 300" (trade name; product of Cabot Speciality Chemicals Ink: surface-modified type pigment)

TABLE 11

|  | Ex. 4-1 | Ex. 4-2 | Ex. 4-3 | Ex. 4-4 | Ex. 4-5 | Ex. 4-6 | Comp. Ex. 4-1 | Comp. Ex. 4-2 | Comp. Ex. 4-3 | Comp. Ex. 4-4 | Comp. Ex. 4-5 |
|---|---|---|---|---|---|---|---|---|---|---|---|
| Colorant 1 (g) | 5 |  |  |  | 5 |  | 5 |  |  |  |  |
| Colorant 2 (g) |  | 4 |  |  |  |  |  |  |  | 4 |  |
| Colorant 3 (g) |  |  | 4 |  |  |  |  |  | 4 |  |  |
| Colorant 4 (g) |  |  |  | 5 |  | 5 |  | 5 |  |  | 5 |
| Compound 1-1 (g) |  |  |  |  |  | 1.5 |  |  |  |  |  |
| Compound 1-2 (g) |  | 1 |  |  |  |  |  |  |  |  |  |
| Compound 1-3 (g) | 0.5 |  |  | 0.5 |  |  |  |  | 10.1 |  |  |
| Compound 1-4 (g) |  | 0.3 |  |  | 0.3 |  |  |  |  | 1.5 |  |
| Compound 1-5 (g) |  |  |  |  |  |  |  |  |  |  | 0.5 |
| Compound 24a-1 (g) | 5 |  |  |  |  |  | 5 |  |  |  |  |
| Compound 24a-2 (g) |  | 4 |  |  |  |  |  |  |  |  |  |
| Compound 24a-3 (g) |  |  | 3 |  | 3 |  |  | 3 |  |  |  |
| Compound 24b-1 (g) |  |  |  | 3 |  |  |  |  |  |  |  |
| Compound 24b-2 (g) |  |  |  |  |  | 5 |  |  |  | 5 |  |

Colorant 1: "Direct Fast Black AB" (trade name; product of Sumitomo Chemical Industry: direct dye)
Colorant 2: #0542 (trade name; product of Mikuni Shikiso: resin dispersion type pigment)
Colorant 3: "Karayas Turquoise Blue GL" (trade name; Nippon Kayaku: direct dye)
Colorant 4: "Cabojet 300" (trade name; product of Cabot Speciality Chemicals Ink: surface-modified type pigment)

TABLE 12

|  | Ex. 5-1 | Ex. 5-2 | Ex. 5-3 | Ex. 5-4 | Ex. 5-5 | Ex. 5-6 | Comp. Ex. 5-1 | Comp. Ex. 5-2 | Comp. Ex. 5-3 | Comp. Ex. 5-4 | Comp. Ex. 5-5 |
|---|---|---|---|---|---|---|---|---|---|---|---|
| Colorant 1 (g) | 5 |  |  |  | 5 |  | 5 |  |  |  |  |
| Colorant 2 (g) |  | 4 |  |  |  |  |  |  |  | 4 |  |
| Colorant 3 (g) |  |  | 4 |  |  |  |  |  | 4 |  |  |
| Colorant 4 (g) |  |  |  | 5 |  | 5 |  | 5 |  |  | 5 |
| Compound 1-3 (g) |  |  |  |  |  | 1.5 |  |  |  |  |  |
| Compound 1-4 (g) |  | 1 |  |  |  |  |  |  |  |  |  |
| Compound 1-5 (g) | 0.5 |  |  | 0.5 |  |  |  |  | 10.1 |  |  |
| Compound 1-6 (g) |  | 0.3 |  |  | 0.3 |  |  |  |  | 1.5 |  |
| Compound 1-7 (g) |  |  |  |  |  |  |  |  |  |  | 0.5 |
| Compound 25a-1 (g) | 0.8 |  |  |  | 0.8 |  |  |  | 0.8 |  |  |
| Compound 25a-2 (g) |  | 1 |  |  |  |  | 1 |  |  |  |  |
| Compound 25a-3 (g) |  |  | 0.8 |  |  |  |  |  |  |  |  |
| Compound 25b-1 (g) |  |  |  | 1 |  |  |  |  |  | 1 |  |
| Compound 25b-2 (g) |  |  |  |  |  | 0.6 |  |  |  |  |  |

Colorant 1: "Direct Fast Black AB" (trade name; product of Sumitomo Chemical Industry: direct dye)
Colorant 2: #0542 (trade name; product of Mikuni Shikiso: resin dispersion type pigment)
Colorant 3: "Karayas Turquoise Blue GL" (trade name; Nippon Kayaku: direct dye)
Colorant 4: "Cabojet 300" (trade name; product of Cabot Speciality Chemicals Ink: surface-modified type pigment)

Evaluation Tests

<Evaluation of Ejection Stability>

The aqueous ink compositions obtained in Examples and Comparative Examples were each filled in a piezoelectric inkjet printer "MJ-930C" (trade name; manufactured by Seiko Epson Corporation), and ejection stability was evaluated by the following method. First, printing by MJ-930C filled with each aqueous ink composition was conducted continuously for 20 minutes and whether the ejection was normal or not was confirmed. Subsequently, with respect to aqueous ink compositions with which normal ejection was attained, non-printing time was set for one minute immediately after the above printing while separating the head carriage portion from the cap portion. Printing was restarted immediately after passage of the non-printing time. From the ejected states in the continuous printing and the printing after the non-printing time, ejection stability was ranked according to the criteria described below.

The evaluation results are shown below in Tables 13 to 17.

Rank A: normal ejection after both continuous printing and printing after non-printing time Rank B: Ejection after continuous printing is normal, but ejection is slightly unstable in printing after non-printing time.

Rank C: Ejection after continuous printing is normal, but ejection is unstable in printing after non-printing time.

Rank D: Ejection is unstable after both continuous printing and printing after non-printing time.

As is apparent from Tables 13 to 17, the aqueous ink compositions obtained in Examples of the invention exhibit good ejection stability, as compared to those of Comparative Examples free of a "surface active substance capable of causing an acetylene alcohol compound to dissolve in water". In other words, the aqueous ink compositions containing both the acetylene alcohol compound and the "surface active substance capable of causing the acetylene alcohol compound to dissolve in water" are excellent in ejection stability.

Incidentally, even when the "surface active substance capable of causing the acetylene alcohol compound to dissolve in water" is contained, ejection is unstable if the addition amount of the hydrophobic acetylene alcohol compound exceeds 10 wt. % as aqueous ink compositions obtained in Comparative Examples 1-3, 2-3, 3-3, 4-3 and 5-3.

<Evaluation of Print Quality>

The aqueous ink compositions obtained in Examples and Comparative Examples were filled in the inkjet printer "MJ-930C" and characters of 10 point in size were printed on plain papers and recycled papers. However, the aqueous ink compositions obtained in Comparative Examples 1-3 to 1-5, 2-3 to 2-5, 3-3 to 3-5, 4-3 to 4-5, and 5-3 to 5-5 failed to provide recorded matter because of poor ejection stability. Five kinds of papers were used for evaluation. They were, as neutral plain papers, "Xerox-P" and "Xerox-4024" (each, trade name; product of Fuji Xerox), as acid plain paper, "EPP" (trade name; product of Seiko Epson), and as recycled papers, "Xerox-R" (trade name; product of Fuji Xerox) and "Yamayuri" (trade name; product of Honshu Seishi). The printed characters were evaluated visually and print quality was ranked in accordance with the criteria described below. The evaluation results are shown in Tables 13 to 17.

Rank A: Good print quality is observed with all the evaluated papers.

Rank B: Deterioration in print quality is observed with two or less kinds of papers among the evaluated papers.

Rank C: Deterioration in print quality is observed with three or more kinds of papers among the evaluated papers.

Rank D: Deterioration in print quality is observed with all the evaluated papers.

As is apparent from Tables 13 to 17 below, the aqueous ink compositions of the invention obtained in Examples are superior in print quality to those of Comparative Examples free of an acetylene alcohol compound. This means that the aqueous ink compositions containing an acetylene alcohol compound are excellent in print quality.

<Evaluation of Fixing Property>

The printed matters obtained by filling the aqueous ink compositions obtained in Examples and Comparative Examples in the inkjet printer MJ-930C, and then printing characters of 10 point in size on plain paper and recycled paper were evaluated for fixing property (scratch resistance) in the following manner. Specifically, the recorded matter was placed under an environment of at 25° C. and 40% RH, and paper of the same kind as that employed for recording was stacked over the recorded paper immediately after printing or after standing overnight, followed by rubbing the recorded paper through the stacked paper with applying a pressure of 300 g/cm². The state after rubbing was visually observed and judged in accordance with the criteria described below. The results are shown below in Tables 13 to 17.

Rank A: Neither immediately after printing nor after standing overnight, stain due to rubbing appears.

Rank B: Only immediately after printing, stain due to rubbing appears slightly.

Rank C: Both immediately after printing and after standing overnight, stain due to rubbing appears.

Rank D: Both immediately after printing and after standing overnight, stain due to rubbing appears. Particularly immediately after printing, marked stain appears.

As is apparent from Tables 13 to 17 below, the aqueous ink compositions of the invention obtained in Examples are superior in fixing property to those obtained in Comparative Examples 1-2, 2-2, 3-2, 4-3 and 5-2 which used a pigment as the colorant and was free of a hydrophobic acetylene alcoholic compound.

TABLE 13

| | Evaluation of ejection stability | Evaluation of print quality | Evaluation of fixing property |
|---|---|---|---|
| Example 1-1 | A | A | A |
| Example 1-2 | A | A | B |
| Example 1-3 | A | A | A |
| Example 1-4 | A | A | B |
| Example 1-5 | A | A | A |
| Example 1-6 | A | A | B |
| Comp. Ex. 1-1 | A | D | B |
| Comp. Ex. 1-2 | B | D | D |
| Comp. Ex. 1-3 | D | — | — |
| Comp. Ex. 1-4 | D | — | — |
| Comp. Ex. 1-5 | D | — | — |

TABLE 14

| | Evaluation of ejection stability | Evaluation of print quality | Evaluation of fixing property |
|---|---|---|---|
| Example 2-1 | A | A | A |
| Example 2-2 | A | A | B |

TABLE 14-continued

| | Evaluation of ejection stability | Evaluation of print quality | Evaluation of fixing property |
|---|---|---|---|
| Example 2-3 | A | A | A |
| Example 2-4 | A | A | B |
| Example 2-5 | A | A | A |
| Example 2-6 | A | A | B |
| Comp. Ex. 2-1 | A | D | B |
| Comp. Ex. 2-2 | B | D | D |
| Comp. Ex. 2-3 | D | — | — |
| Comp. Ex. 2-4 | D | — | — |
| Comp. Ex. 2-5 | D | — | — |

TABLE 15

| | Evaluation of ejection stability | Evaluation of print quality | Evaluation of fixing property |
|---|---|---|---|
| Example 3-1 | A | A | A |
| Example 3-2 | A | A | B |
| Example 3-3 | A | A | A |
| Example 3-4 | A | A | B |
| Example 3-5 | A | A | A |
| Example 3-6 | A | A | B |
| Comp. Ex. 3-1 | A | D | B |
| Comp. Ex. 3-2 | B | D | D |
| Comp. Ex. 3-3 | D | — | — |
| Comp. Ex. 3-4 | D | — | — |
| Comp. Ex. 3-5 | D | — | — |

TABLE 16

| | Evaluation of ejection stability | Evaluation of print quality | Evaluation of fixing property |
|---|---|---|---|
| Example 4-1 | A | A | A |
| Example 4-2 | A | A | B |
| Example 4-3 | A | A | A |
| Example 4-4 | A | A | B |
| Example 4-5 | A | A | A |
| Example 4-6 | A | A | B |
| Comp. Ex. 4-1 | A | D | B |
| Comp. Ex. 4-2 | B | D | D |
| Comp. Ex. 4-3 | D | — | — |
| Comp. Ex. 4-4 | D | — | — |
| Comp. Ex. 4-5 | D | — | — |

TABLE 17

| | Evaluation of ejection stability | Evaluation of print quality | Evaluation of fixing property |
|---|---|---|---|
| Example 5-1 | A | A | A |
| Example 5-2 | A | A | B |
| Example 5-3 | A | A | A |
| Example 5-4 | A | A | B |
| Example 5-5 | A | A | A |
| Example 5-6 | A | A | B |
| Comp. Ex. 5-1 | A | D | B |
| Comp. Ex. 5-2 | B | D | D |
| Comp. Ex. 5-3 | D | — | — |
| Comp. Ex. 5-4 | D | — | — |
| Comp. Ex. 5-5 | D | — | — |

As described in detail above, the combined use of at least one acetylene alcohol compound represented by formula (1) and a surface active substance capable of causing the acetylene alcohol compound of formula (1) to dissolve in water, as additives in an aqueous ink composition, brings about excellent advantages in ejection stability, print quality, fixing property and adaptability to paper.

While the invention has been described in detail and with reference to specific examples thereof, it will be apparent to one skilled in the art that various changes and modifications can be made therein without departing from the spirit and scope thereof.

What is claimed is:

1. An aqueous ink composition comprising at least:
   a colorant; water; 0.005 to 10 wt. %, based on the whole weight of the ink composition, of at least one acetylene alcohol compound represented by the following formula (1):

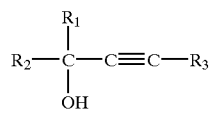

(1)

wherein $R_1$, $R_2$ and $R_3$ each independently represents a hydrogen atom, an alkyl group which may be branched, or an alkylphenyl group; and a surface active substance capable of causing the acetylene alcohol compound of formula (1) to dissolve in water, wherein the surface active substance comprises at least one compound selected from compounds represented by the following formulas (21a), (21b), (21c), (21d), (21e) and (21f):

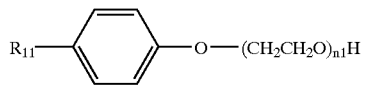

(21a)

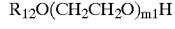

(21b)

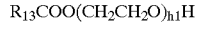

(21c)

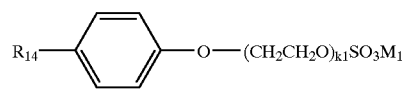

(21d)

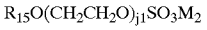

(21e)

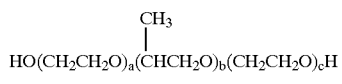

(21f)

wherein $R_{11}$ to $R_{15}$ each independently represents a $C_{1-15}$ alkyl group which may be branched, subscripts n1, m1, h1, k1, j1, a, b and c each independently stands for a numeral of 1 to 30, and $M_1$ and $M_2$ each independently represents a hydrogen atom, an alkali metal or a base such as ammonium.

2. An aqueous ink composition comprising at least:
   a colorant; water; 0.005 to 10 wt. %, based on the whole weight of the ink composition, of at least one acetylene alcohol compound represented by the following formula (1):

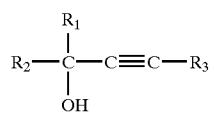

(1)

wherein $R_1$, $R_2$ and $R_3$ each independently represents a hydrogen atom, an alkyl group which may be branched, or an alkylphenyl group; and a surface active substance capable of causing the acetylene alcohol compound of formula (1) to dissolve in water, wherein the surface active substance comprises at least one 1,2-alkyldiol compound represented by the following formula (22):

$$HO-CH_2-CH(OH)-R_{21} \qquad (22)$$

wherein $R_{21}$ represents a $C_{1-10}$ alkyl group.

3. An auueous ink composition comprising at least:
a colorant; water; 0.005 to 10 wt. %, based on the whole weight of the ink composition, of at least one acetylene alcohol compound represented by the following formula (1):

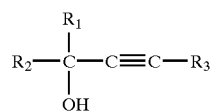

wherein $R_1$, $R_2$ and $R_3$ each independently represents a hydrogen atom, an alkyl group which may be branched, or an alkylphenyl group; and a surface active substance capable of causing the acetylene alcohol compound of formula (1) to dissolve in water, wherein the surface active substance comprises at least one compound selected from the compounds represented by the following formulas (23a) and (23b):

wherein $R_{31}$ represents a $C_{1-15}$ alkyl group which may be branched, or an alkylphenyl group, and subscripts n3 and m3 each independently stands for a numeral of 0 to 10.

4. An aqueous ink composition comprising at least:
a colorant; water; 0.005 to 10 wt. %, based on the whole weight of the ink composition, of at least one acetylene alcohol compound represented by the following formula (1):

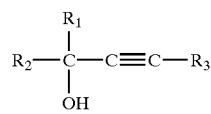

wherein $R_1$, $R_2$ and $R_3$ each independently represents a hydrogen atom, an alkyl group which may be branched, or an alkylphenyl group; and a surface active substance capable of causing the acetylene alcohol comnound of formula (1) to dissolve in water, wherein the surface active substance comprises at least one compound selected from phosphate ester compounds represented by the following formulas (24a) and (24b):

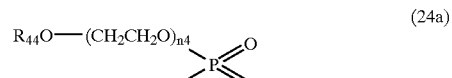

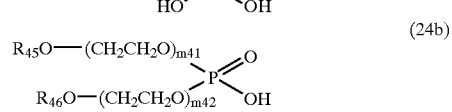

wherein $R_{44}$, $R_{45}$ and $R_{46}$ each independently represents a $C_{8-30}$ alkyl group which may be branched, or an alkylphenyl group, and subscripts n4, m41 and m42 each independently stands for a numeral of 1 to 30.

5. The aqueous ink composition of any one of claims 1–4, wherein the surface active substance is contained in an amount of 0.1 to 10 wt % based on the whole weight of the aqueous ink composition.

6. The aqueous ink composition of any one of claims 1–4, wherein the total number of carbon atoms of $R_1$, $R_2$ and $R_3$ of the acetylene alcohol compound represented by formula (1) is at least 5.

7. The aqueous ink composition of any one of claims 1–4, wherein the surface tension at 20° C. of the aqueous ink composition is 20 to 55 mN/m.

8. The aqueous ink composition of any one of claims 1–4, wherein the colorant is a pigment.

9. A method of inkjet printing comprising the steps of:

(a) providing the aqueous ink composition of any one of claims 1–4; and (b) ejecting droplets of the ink composition onto a recording medium to form a print thereon.

10. An ink cartridge comprising:

(a) the aqueous ink composition of any one of claims 1–4; and (b) an ink container in which the aqueous ink composition is contained.

* * * * *